Feb. 12, 1924.  1,483,720
J. DLESK, JR., ET AL
FEEDING MECHANISM FOR RIVET MACHINES
Filed Aug. 5, 1922  5 Sheets-Sheet 1
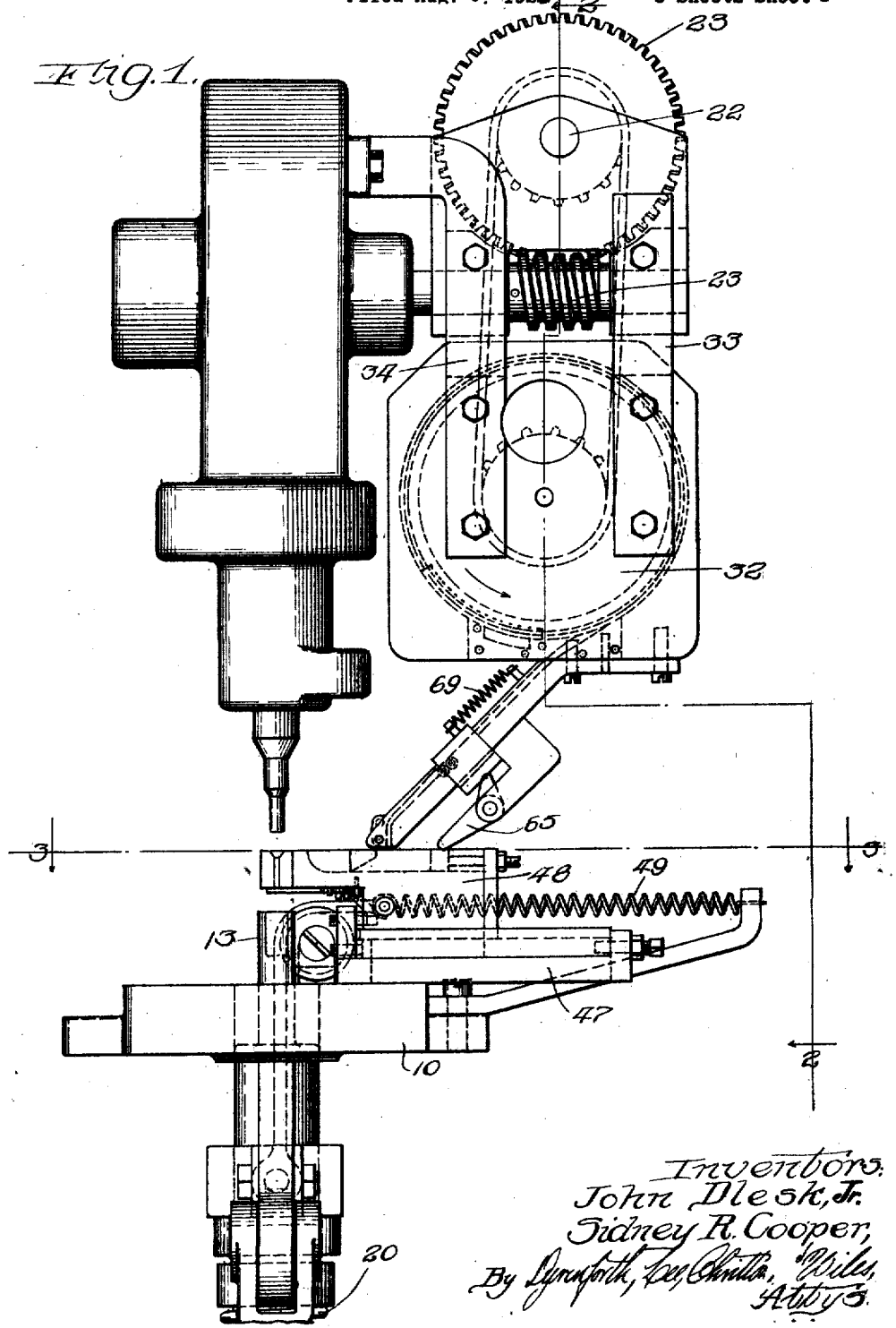

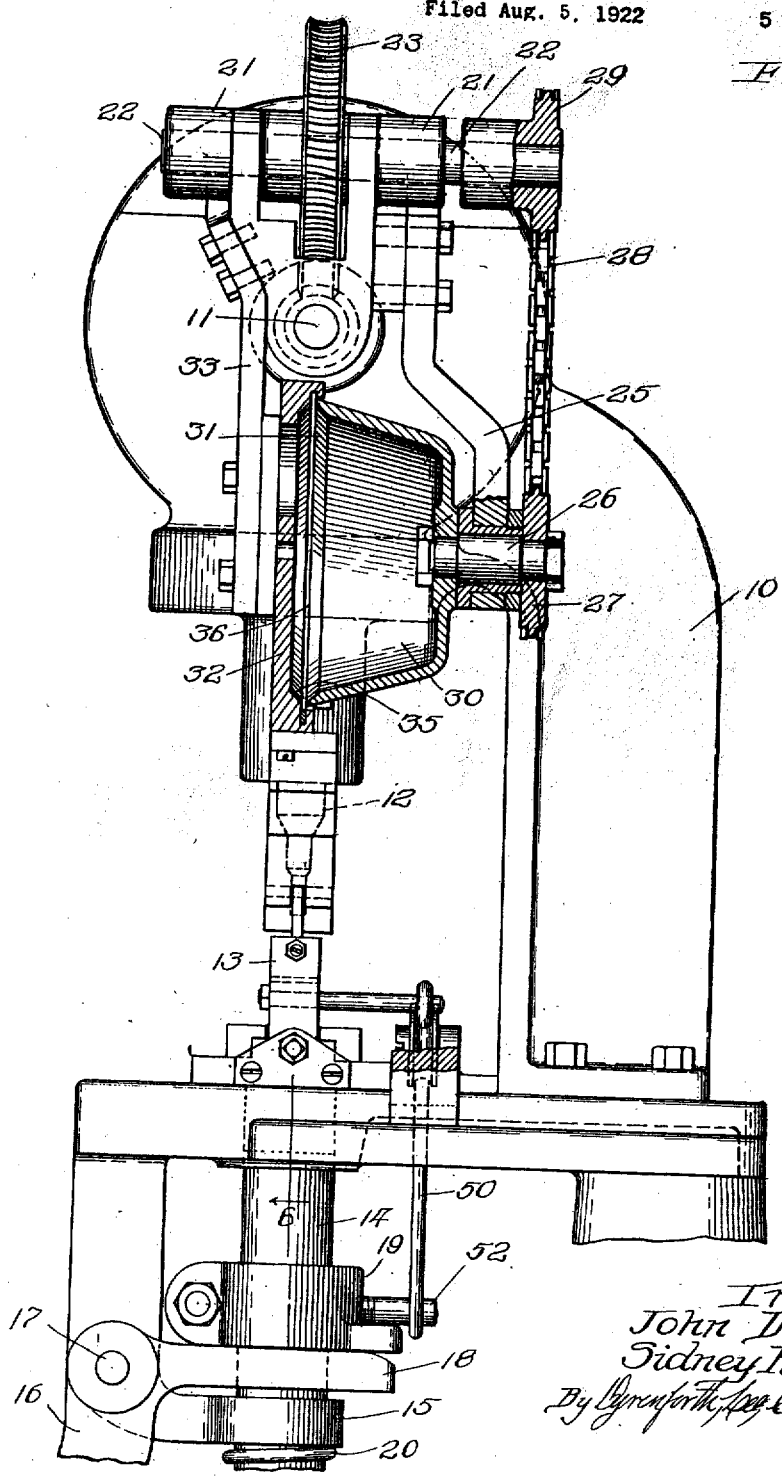

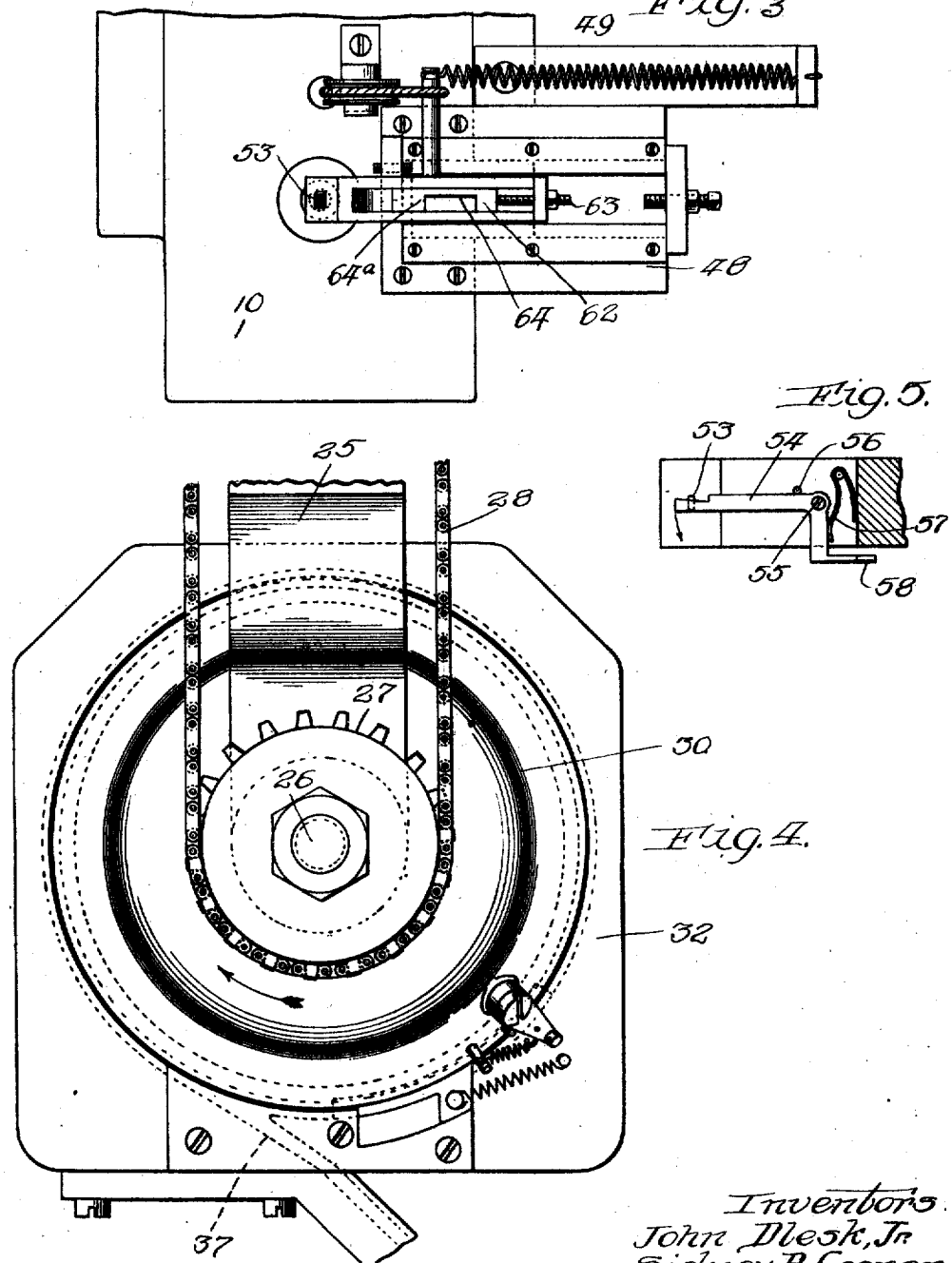

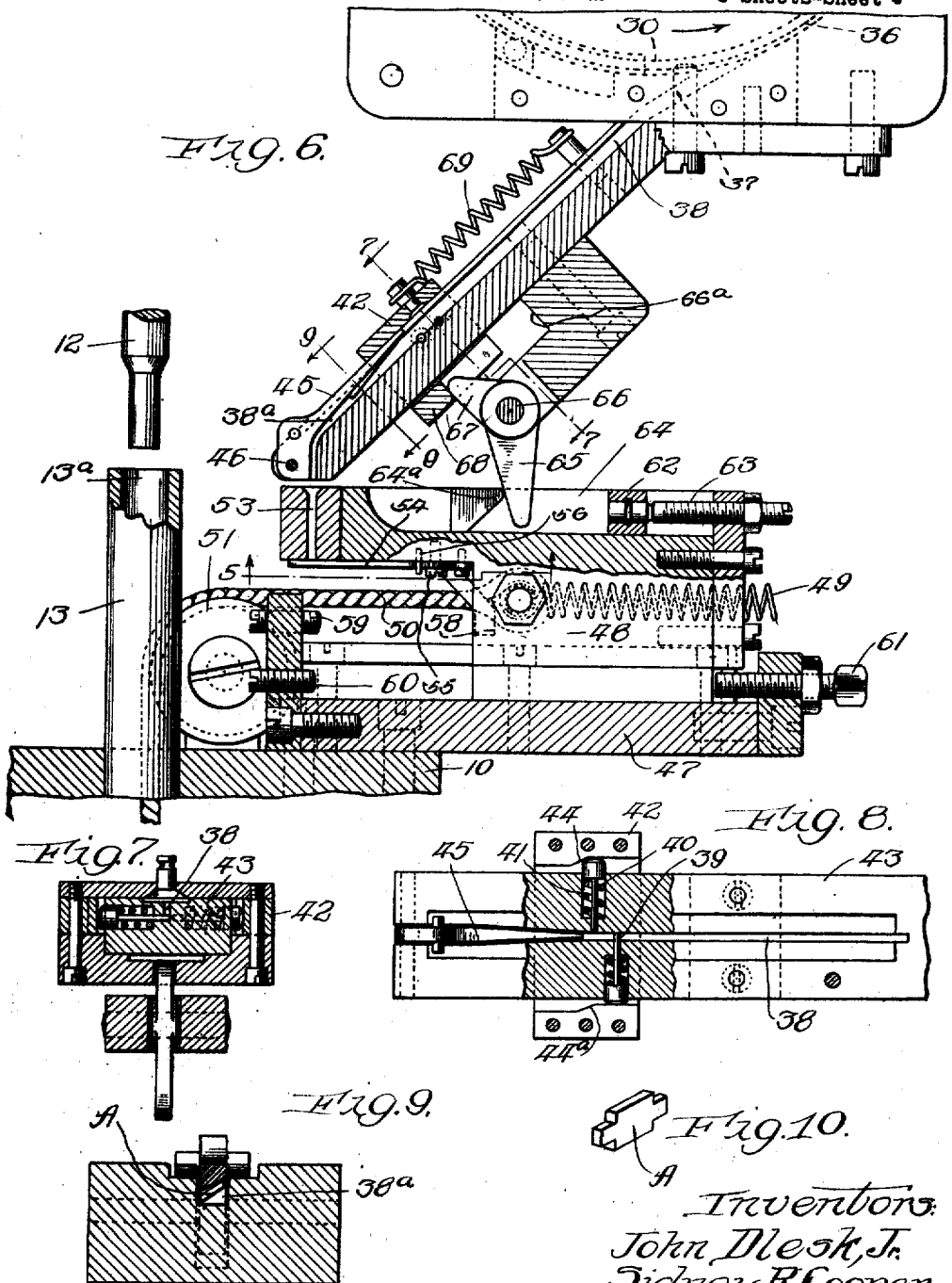

Feb. 12, 1924.
J. DLESK, JR., ET AL
1,483,720
FEEDING MECHANISM FOR RIVET MACHINES
Filed Aug. 5, 1922
5 Sheets-Sheet 5
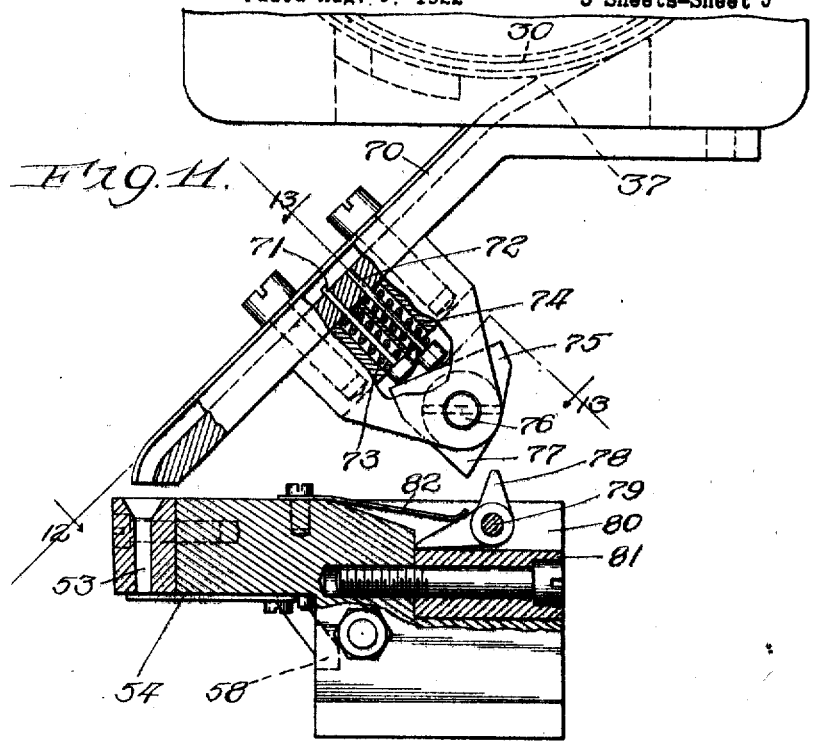
Inventors.
John Dlesk, Jr.
Sidney R. Cooper,
By Lynnforth, Lee, Chritton, Wiles
Attys Patented Feb. 12, 1924.

1,483,720

UNITED STATES PATENT OFFICE.

JOHN DLESK, JR., AND SIDNEY R. COOPER, OF CHICAGO, ILLINOIS, ASSIGNORS TO U. S. BALL BEARING MANUFACTURING COMPANY, OF CHICAGO, ILLINOIS, A CORPORATION OF ILLINOIS.

FEEDING MECHANISM FOR RIVET MACHINES.

Application filed August 5, 1922. Serial No. 579,891.

*To all whom it may concern:*

Be it known that we, JOHN DLESK, Jr., and SIDNEY R. COOPER, citizens of the United States, each residing at the city of Chicago, in the county of Cook and State of Illinois, have invented a new and useful Improvement in Feeding Mechanism for Rivet Machines, of which the following is a specification.

This invention relates to mechanism for feeding rivets to a riveting machine or the like, and is fully described in the following specification and shown in the accompanying drawings, in which:

Figure 1 is a side elevation of a riveting machine showing our invention applied thereto;

Fig. 2 is a front elevation of the same partly in section on the line 2—2 of Figure 1;

Fig. 3 is a partial plan view on the line 3—3 of Fig. 1;

Fig. 4 is a partial enlarged elevation of the feeding drum;

Fig. 5 is a partial plan view on the line 5 of Fig. 6;

Fig. 6 is an enlarged partial section on the line 6 of Fig. 2;

Fig. 7 is a section on the line 7—7 of Fig. 6;

Fig. 8 is a detail of the stop mechanism shown in Fig. 6;

Fig. 9 is an enlarged section on the line 9—9 of Fig. 6;

Fig. 10 is an enlarged perspective view of a rivet adapted to be used with this mechanism;

Fig. 11 is a view similar to Fig. 6 showing a modified form of chute;

Fig. 12 is a view on the line 12 of Fig. 11; and

Fig. 13 is a section on the line 13—13 of Fig. 11.

This feeding mechanism is applied to the riveting machine of a well known type having a frame 10 which carries a driving shaft 11. This shaft operates a mechanism (not shown) to cause the hammer 12 to vibrate rapidly in a well known manner when a rivet or the like is forced up under this hammer from beneath. The above mechanism forms no part of the present invention and consequently is not illustrated.

The anvil 13 is carried by a rod 14 as shown in Figures 1 and 2 and is normally held in a low position by means of the stop 15 carried by the frame 10. An operating lever 16 is hingedly mounted upon the pin 17 and has a bifurcated lug 18 surrounding the rod 14 and acting upon the collar 19 which is secured to this rod. A spring 20 serves to maintain these parts in the lowermost position as shown in Fig. 1.

The upper part of the frame carries spaced arms 21 in which is journaled a shaft 22. A worm wheel 23 keyed on this shaft meshes with a worm 24 on the shaft 11.

The bracket 25 is secured to the arm 21 and carries a bearing in which is journaled a short shaft 26. The outer end of this shaft has a sprocket wheel 27 keyed thereto. This sprocket is connected by means of a chain 28 with a sprocket 29 which is keyed on the shaft 22. The other end of the shaft 26 carries a conical drum 30, the open edge of which is internally beveled at 31.

The open end of this drum is closed by means of a plate 32 which is counter-sunk to receive the same. This plate is supported by means of brackets 33 and 34 as shown in Figure 1.

The inner edge of the plate 32 is beveled at 35 and corresponds to the bevel 31 of the drum. An annular groove 36 is left between the counter-sunk face of the plate and the edge of the drum 30 of such a width as to permit the rivets $a$ (Fig. 10) to lie edgewise therein.

Referring now to Fig. 6, this annular groove 36 terminates in a passage 37 which leads to the chute 38.

It will be understood from the foregoing that as the drum 30 (Fig. 6) rotates in a counter clock-wise direction, the rivets in the drum 30 will be forced into the groove 36 by centrifugal action and that they will have a tendency to work down through the passage 37 into the chute 38. Any suitable means may be employed for agitating the rivets in the groove 36 to prevent them from becoming lodged therein.

The stop mechanism illustrated in Figs. 6, 7 and 8 is provided for intermittently passing the rivets through the chute 38. Pins 39 and 40 enter the chute 38 from opposite sides and are pressed outwardly by means of springs 41. A cam 42 is mounted to slide longitudinally upon the casing 43 in which the chute 38 is formed. This cam has cam faces 44 and 44ª against which the outer ends of the pins 39 and 40 are held by means of the springs 41.

In the position shown in Fig. 8 the pin 39 extends across the chute 38 preventing the passage of the rivets above that point. As the cam 42 is moved to the right in Fig. 8, as will later be explained, the pin 40 is moved across the slot 38 by means of the cam face 44 and an instant later on a further movement of the cam 42 to the right, the cam face 44ª permits the pin 39 to be withdrawn, thereby allowing the rivets in the slot 38 to descend till the lowermost strikes the pin 40.

Upon reverse movement of the cam 42, the parts return to the position shown in Fig. 8 and the rivet held between the pins 39 and 40 is permitted to pass down through the slot by gravity. As it does so, it encounters the angularly flared lower surface of the member 45 which is hingedly mounted upon a pin 46 at the curved lower end of the chute. This member causes the rivet A to be turned through an angle of substantially 90°. In Fig. 9 it is shown in the process of being turned.

Referring to Figs. 1 and 6 guides 47 are secured to the main frame 10 and have a block or shuttle 48 slidably mounted therein. This shuttle is normally held in the position shown in Fig. 1 and is returned to the position shown in Fig. 6 by means of the tension spring 49 as the anvil is raised. The shuttle, however, is connected to the rod 14 by means of a flexible rope 50 or the like which passes over the sheave 51 and is secured to the rod 14 by means of a pin 52. It will be understood from the foregoing that as the anvil is raised, the rope 50 will permit the spring 49 to return the shuttle 48 to the position shown in Fig. 6.

In this position the opening 53 in the end of the shuttle member will be immediately beneath the end of the chute 38 so that the last rivet released by means of the pin 40 will fall into this opening. It will be retained therein by means of the trip lever 54 (Fig. 5) which is pivotally mounted at 55. This trip lever is normally held against the stop 56 by means of a spring 57 and carries a trip finger 58 which is adapted to engage the adjusting screw 59 (Fig. 6) when the shuttle 48 again is returned to the position shown in Fig. 1 upon the anvil 13 being returned to its normally lowered position. The adjusting screw 60 fixes the position of the shuttle 48 so that the opening 53 is directly over the rivet slot 13ª in the end of the anvil 13. The screw 59 is so adjusted with respect to the screw 60 that the lever 54 will be moved so as to uncover the opening 53. As this opening comes over the slot 13ª so that the rivet received in the opening on the last forward movement will be dropped into the slot and will be ready for the riveting action when the anvil 13 is again raised, in a like manner the adjusting screw 61 fixes the outer movement of the shuttle 48 so that it is directly beneath the end of the slot 38.

The shuttle 48 carries a hollow block 62 which is adjustably held therein by means of a screw 63. This block has an opening 64 adapted to receive the arm 65 of the bell crank (Fig. 6) which is pivotally mounted at 66. The other arm 67 of the bell crank engages a shoulder 68 on the lower side of the cam 42, as shown in Fig. 6. The spring 69 holds this shoulder pressed against the lever arm 67.

As the shuttle 48 moves to the left as shown in Fig. 1, the cam 42 is permitted to be drawn back by the spring 69 until the cam 42 strikes the shoulder 66ª (Fig. 6) at which time the arm 65 is still within the opening 64. As the shuttle 48 moves to the right, as shown in Fig. 6, the shoulder 64ª engages the arm 65, causing the cam 42 to move down as shown. These alternate movements of the cam 42 cause the rivets to be fed down one at a time through the chute 38 as has been previously explained.

In Figs. 11, 12 and 13 is shown a modified form of the feeding mechanism in which the drum 30 feeds rivets through the passage 37 to the chute 70 in the same manner as that previously explained for the chute 38. In this case the rivets are stopped by the pin 71, which is normally in the position shown in Fig. 11. A similar pin 72 is mounted just above it and both are pressed outwardly by suitable springs 73 and 74, the latter being the stronger so as to hold the pins in the position shown against the rocker arm 75, which is hingedly mounted at 76.

This rocker arm has a projection 77, adapted to engage the operating finger 78 which is hingedly mounted at 79 in a slot 80 in the shuttle 81.

It is to be understood that this shuttle takes the place of the shuttle 48 and is similarly operated by the mechanism for raising and lowering the anvil 13 by means of the rope 50 and the spring 49.

The operating finger 78 is normally held in the position shown in Fig. 11 by means of the light spring 82, which permits the finger to yield in a clock-wise direction as the shuttle 81 is moved to the left beneath the projection 78. When the finger 78 has passed the projection 77, however, it immediately snaps back to the position shown so that upon the next movement of the shuttle 81 to the right, it will move the rocker arm in a counter clock-wise direction, thereby withdrawing the pin 71 and forcing the pin 72 into the longitudinal slot or chute 70.

By this movement, the lowermost rivet in the line is dropped by the pin 71 while those above it are held by the pin 72. At the time this rivet is dropped the opening 53 is directly beneath the lower end of the chute 70 so that the rivet falls into the opening and is retained therein by the lever 54 which is mounted upon the shuttle 81. The method of mounting this lever and its operation are exactly the same as is shown and previously described.

While we have shown and described but a few embodiments of our invention, it is to be understood that it is capable of many modifications. Changes, therefore, in the construction and arrangement may be made without departing from the spirit and scope of the invention as disclosed in the appended claims.

What we claim as new, and desire to secure by Letters Patent, is:

1. In combination, a riveting machine having a longitudinally movable anvil, a rivet holding means in said anvil, a chute through which rivets may be fed, a shuttle having an opening adapted to receive a rivet, and means associated therewith for carrying a rivet from said chute to said anvil on each longitudinal movement of the anvil.

2. In combination, a riveting machine having a longitudinally movable anvil, a rivet holding means in said anvil, a chute through which rivets may be fed, and a shuttle associated therewith and movable from a position beneath said chute to a position above said anvil for carrying a rivet from said chute to said anvil on each longitudinal movement of the anvil.

3. In combination, a riveting machine having a longitudinally movable anvil, a rivet holding means in said anvil, a chute through which rivets may be fed, a shuttle, means in said chute for feeding a rivet upon each movement of the shuttle in a given direction, and means carried by said shuttle for receiving and carrying said rivet and for depositing it in said rivet holding means upon the next movement of the shuttle in the opposite direction.

4. In combination, a riveting machine having a longitudinally movable anvil, a rivet holding means in said anvil, a chute through which rivets may be fed, a shuttle, means in said chute for feeding a rivet upon each movement of the shuttle in a given direction, an opening in said shuttle movable to a point beneath the end of said chute to receive a rivet when fed therefrom, and means for retaining the rivet in said opening, said last named means being operable to release the rivet when said opening overlies said rivet holding means.

5. In combination, a riveting machine having a longitudinally movable anvil, a rivet holding means in said anvil, a chute through which rivets may be fed, a shuttle, pins carried by said chute and alternately movable by said shuttle to close and open said chute so as to feed rivets one at a time, and means carried by said shuttle for carrying a rivet from said chute to said anvil on each longitudinal movement of the anvil.

6. In combination, a riveting machine having a longitudinally movable anvil, a rivet holding means in said anvil, a chute through which rivets may be fed, a shuttle, means in said chute for feeding a rivet upon each movement of the shuttle in a given direction, pins carried by said chute and alternately movable by said shuttle to close and open said chute so as to feed rivets one at a time, and means carried by said shuttle for receiving said rivet and for depositing it in said rivet holding means upon the next movement of the shuttle in the opposite direction.

7. In combination, a riveting machine having a longitudinally movable anvil, a rivet holding means in said anvil, a chute through which rivets may be fed, means in said chute for feeding a rivet upon each movement of the shuttle in a given direction, a shuttle, pins carried by said chute and alternately movable by said shuttle to close and open said chute so as to feed rivets one at a time, an opening in said shuttle movable to a point beneath the end of said chute to receive a rivet when fed therefrom, and means for retaining the rivet in said opening, said last named means being operable to release the rivet when said opening overlies said rivet holding means.

JOHN DLESK, Jr.
SIDNEY R. COOPER.